United States Patent

Reverman et al.

[11] Patent Number: 6,006,407
[45] Date of Patent: Dec. 28, 1999

[54] APPARATUS FOR REPAIRING A TURBINE ENGINE VANE SEGMENT

[75] Inventors: Jeffrey J. Reverman; Jerry L. McFarland, Jr., both of Cincinnati; Michael W. Auger, Fairfield, all of Ohio

[73] Assignee: General Electric Company, Cincinnati, Ohio

[21] Appl. No.: 09/016,443

[22] Filed: Jan. 30, 1998

Related U.S. Application Data

[62] Division of application No. 08/759,543, Dec. 5, 1996, Pat. No. 5,758,416.

[51] Int. Cl.$^6$ ........................................... B23P 15/00
[52] U.S. Cl. .................. 29/23.51; 29/889.22; 29/889.23; 29/889.1
[58] Field of Search ..................... 29/281.1, 281.4, 29/283, 700, 738, 23.51, 889.1, 889.22, 889.23

[56] References Cited

U.S. PATENT DOCUMENTS

| | | | |
|---|---|---|---|
| 3,538,579 | 11/1970 | Sprenger | 29/281.1 |
| 4,305,697 | 12/1981 | Cohen et al. | 415/217 |
| 4,830,934 | 5/1989 | Ferrigno et al. | 428/678 |
| 4,873,751 | 10/1989 | Walker et al. | 29/156.8 |
| 5,033,178 | 7/1991 | Woods | 29/281.1 |
| 5,081,765 | 1/1992 | Fraser et al. | 29/889.1 |
| 5,146,679 | 9/1992 | Ortolano | 29/889.7 |
| 5,173,255 | 12/1992 | Ross et al. | 420/445 |
| 5,269,057 | 12/1993 | Mendham | 29/889.1 |
| 5,272,809 | 12/1993 | Robertson et al. | 29/889.1 |
| 5,343,694 | 9/1994 | Toborg et al. | 60/39.31 |
| 5,444,911 | 8/1995 | Goodwater et al. | 29/889.7 |
| 5,490,322 | 2/1996 | Goodwater et al. | 29/722 |
| 5,737,816 | 4/1998 | Hartmann et al. | 29/23.51 |

*Primary Examiner*—Irene Cuda
*Attorney, Agent, or Firm*—Andrew C. Hess; Gerry S. Gressel

[57] ABSTRACT

A method and apparatus for repairing a turbine engine vane segment of at least one airfoil disposed between band or platform members originally assembled in a designed relationship uses locating features integral with at least the band members and used in original assembly. For repair, the members are separated and at least one member is selected for reassembly, while preserving substantially in original form locating features of the selected member. A replacement member is provided for reassembly with the selected member, and the members are reassembled using the preserved locating features for positioning the members in the designed relationship. The apparatus provides elements for moving the segment members into and holding in the designed relationship.

4 Claims, 4 Drawing Sheets

APPARATUS FOR REPAIRING A TURBINE ENGINE VANE SEGMENT

This is a division of patent application Ser. No. 08/759,543, filed Dec. 5, 1996, now U.S. Pat. No. 5,758,416.

CROSS REFERENCE TO RELATED APPLICATIONS

This application is related to application number (13 DV 12515)—Rasch et al, for "Improved Turbine Engine Vane Segment," and to application number (13 DV 12518)—Galley et al, for "Method for Bonding a Turbine Engine Vane Segment," both filed concurrently with this application.

BACKGROUND OF THE INVENTION

This invention relates to the repair of components of turbine engines, for example repair of a vane segment of a turbine engine. More particularly, it relates to the repair of a gas turbine engine turbine vane segment which has experienced high temperature operation in the engine.

During operation in the hot section of a gas turbine engine, portions of air cooled vane segments which have been assembled into a vane assembly, sometimes called a nozzle or nozzle assembly, can become damaged to the point at which replacement or repair is required to maintain safe, efficient engine operation. Because such air cooled components are complex in design, are made of relatively expensive materials, and are expensive to manufacture, repair is the desired choice. The capability for repeating the repair, if necessary after subsequent operation, is a highly desirable goal for any such repair method.

Various repair methods and apparatus have been widely reported and used for many years in the gas turbine engine art. One example is U.S. Pat. No. 4,305,697—Cohen et al., patented Dec. 15, 1981, relating to the repair of a gas turbine engine air cooled vane segment. One example of a gas turbine nozzle showing, among other things, the axial, radial, and circumferential positioning of the nozzle and its members in respect to the engine is described in U.S. Pat. No. 5,343,694—Toborg et al., patented Sep. 6, 1994. Identified in such patents are typical vane assemblies to which this invention also relates. The disclosure of each of such patents hereby is incorporated herein by reference.

During repair of such a vane segment, one or more of the components of the segment are removed and replaced. Frequently, at least the airfoil is replaced because of its exposure to strenuous airflow and high temperature operating conditions. Replacement of an entire member of the segment, such as one or more entire airfoils, requires precise relocation of the replacement part in respect to other members of the segment to provide between the members the relationship originally designed to enable proper airflow through the vane segment. That relationship between the members of a vane segment is referred to herein as the designed relationship.

In addition to the problem of precise relocation of the members which comprise the vane segment is the requirement to regenerate, such as by machining, certain important vane segment features which are filled, covered or distorted during repair. Typical of such features are seal slots at circumferential borders of segment platforms. Known repair methods typically fill such seal slots with brazing alloy or other additional material during repair, requiring remachining of such slots after reassembly of the repaired segment.

BRIEF SUMMARY OF THE INVENTION

The present invention, in one form, provides a method for repairing a turbine engine vane segment which comprises at least one airfoil member carried between spaced apart first and second band members, sometimes called platforms, which include cooperating first and second airfoil shaped openings, respectively, in each of the first and second band members. The first and second band members and the airfoil member are positioned axially, radially and circumferentially in respect to the turbine engine and relative to each other in a designed relationship. Each band member includes a plurality of locating features integral with the band member and designed for use in positioning and aligning a plurality of vane segments with each other in the assembly of a turbine engine vane assembly.

The method comprises the steps of separating the airfoil member and the band members to provide separated segment members while preserving a plurality of the locating features, for example seal slots which are preserved substantially in their original form, unfilled with additional material such as brazing alloy. Selected for reassembly is at least one separated segment member. At least one replacement member is provided for reassembly with the selected segment member or members, an airfoil replacement member having a first end shaped to cooperate with the first airfoil shaped opening in the first band member and a second end shaped to cooperate with the second airfoil shaped opening in the second band member, a band replacement member having a replacement first or second airfoil shaped opening and a plurality of locating features.

The selected separated and replacement members are assembled by holding the first and second band members in a spaced apart relationship by at least a part of the preserved locating features; disposing the airfoil member so that the ends are at the respective cooperating airfoil shaped openings; moving the band members and the airfoil member by means of the locating features into the designed relationship; and, while holding in the designed relationship, securing the ends of the airfoil member at the cooperating respective airfoil shaped openings.

In another form, the present invention provides apparatus for holding the band members at locating features and moving the band members into the designed relationship with the airfoil disposed at the airfoil shaped openings. Such apparatus comprises a base, a band holder pedestal fixable to and projecting from the base, and a plurality of slide guide members, along with axial and circumferential clamping means. The pedestal includes a plurality of distinct protrusions, for example pins, projecting substantially axially from the pedestal, and spaced apart and positioned generally circumferentially at a distance from each other substantially the same as locating features in the base in the form of cooperating band indentations, for example bolt holes, in at least one of the band members. The axial clamping means is included to hold a band member axially in registry with the protrusions within the cooperating band indentations. The plurality of slide guide members are spaced apart and movably carried on the base circumferentially, each slide guide member carrying a plurality of generally radially disposed slides each of which include a slide nose, for example a knife edge or an array of a plurality of aligned protrusions or pins, the slide noses being spaced apart at a substantially radial distance matching a designed relationship radial distance between locating features in the band members in the form of generally axially extending recesses, for example seal slots, each slide edge shaped to cooperate and be aligned with a recess in a band member. The circumferential clamping means is included to hold each slide nose in a cooperating recess circumferentially.

In still another form, the present invention provides a method for assembling members of a vane segment including mounting and clamping a vane segment preform in registry with the protrusions of the pedestal to hold the preform in the axial direction. Then each slide guide member is moved circumferentially toward the preform until the slide noses are in registry with the cooperating recesses in each band member and clamped in that position by the circumferential clamping means. The preform is thereby positioned axially, radially and circumferentially.

DETAILED DESCRIPTION OF THE INVENTION

Generally, complex members of a vane segment, such as the hollow airfoil or the bands, sometimes called platforms, are precision cast because of their complexity and to develop desired mechanical properties and microstructure. Typically, a plurality of vane segments, each commonly including an inner platform, an outer platform, and a plurality of airfoils carried therebetween, as in the above incorporated Cohen et al. and Toborg et al. patents, are assembled circumferentially in respect to an engine axis to provide a vane or nozzle assembly. In order to facilitate such assembly, certain features including surfaces, protrusions, indentations, openings such as holes, and recesses such as seal slots, are included in the original design of the member either in the casting, in subsequent machining of the casting, or both. In this description such features, identified in and discussed in connection with the attached drawings, are referred to as locating features for use with the present invention.

Figure 1:
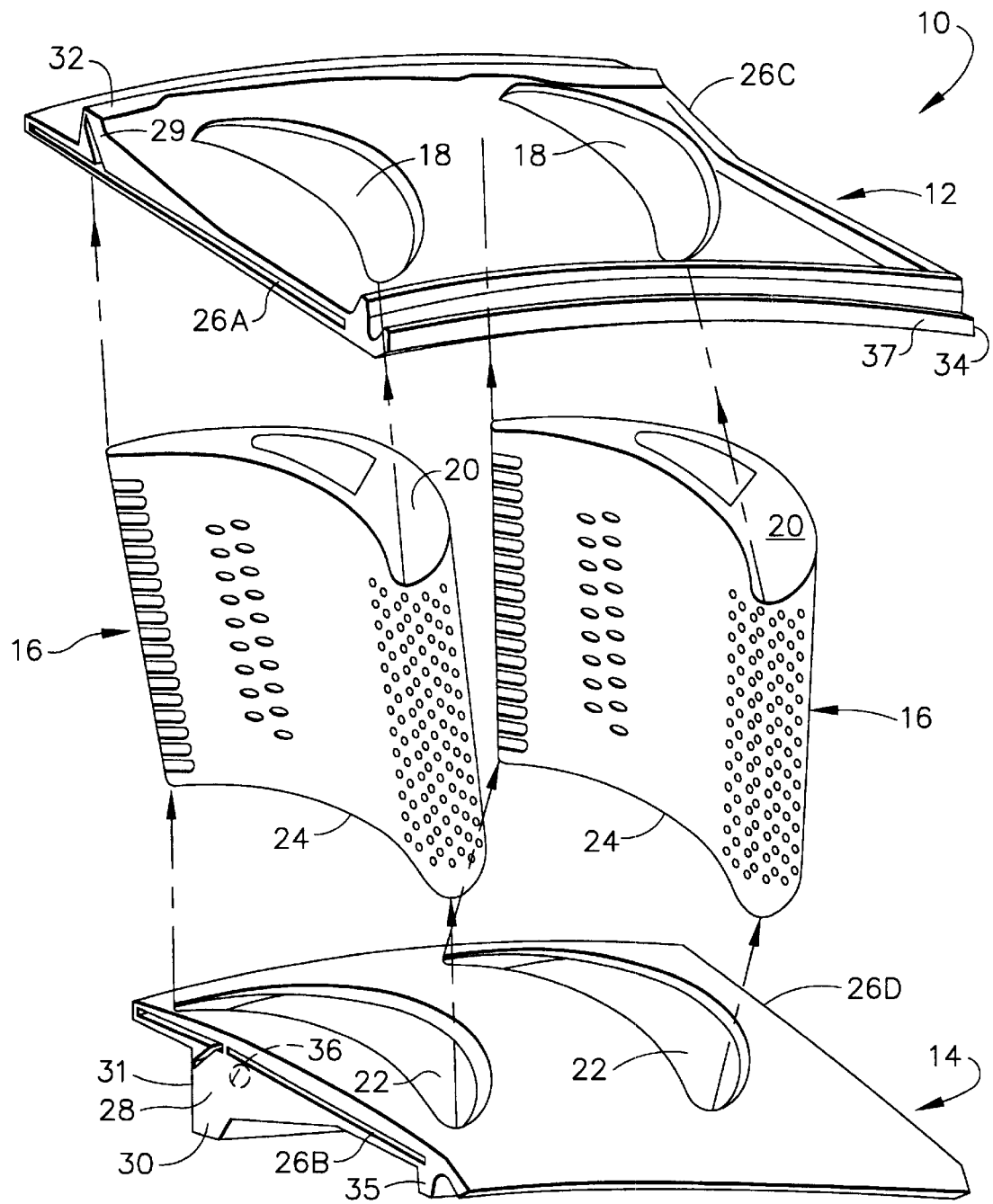
FIG. 1 is an exploded, perspective view of a gas turbine engine vane segment including an inner platform, an outer platform and a pair of air cooled airfoils therebetween.

FIG. 1 of the drawing is an exploded, perspective view of a gas turbine vane segment shown generally at 10 and including, as segment members, an outer platform or band shown generally at 12, an inner platform or band shown generally at 14, and a pair of airfoils 16 between the spaced apart platforms. Outer platform 12 includes a pair of airfoil shaped first openings 18 shaped to cooperate with airfoil first ends 20, respectively as shown. Inner platform 14 includes a pair of airfoil shaped second openings 22 shaped to cooperate with airfoil second ends 24, respectively as shown.

A plurality of the above discussed locating features on the inner and outer platforms can include, but are not linmited to, recesses in the form of opposing seal slots 26A and 26C in the outer platform, and 26B and 26D in the inner platform. In addition, on the inner platform 14 they can include opposing matefaces 28, other surfaces, such as aft surface 31 of inner platform flange 30, surfaces of forward flange 35, and inner flange bolt holes 36. On outer platform 12, such locating features can include surfaces of aft flange 32, such as aft surface 29, and surfaces of forward lip 34, such as forward surface 37. A plurality of such locating features exist on the segment members from original manufacture and are preserved substantially in their original form, and used for holding and repositioning selected separated segment and replacement members in the designed relationship, according to a form of the present invention.

When a vane segment is evaluated for repair, frequently one or more segment members can be repaired by patching, brazing, welding, or otherwise adding material and then refinishing to provide a refurbished, serviceable component without separating individual members of the segment. However, there are a number of instances in which one or more members of a segment, typically an airfoil, are damaged to the point at which such relatively less complicated repair is not practical and the damaged member must be replaced in the segment assembly. It has been a practice in the gas turbine repair art to separate members of the segment, replace a damaged member and reassemble members of the segment. Such separation of members can be accomplished in a variety of ways. One is to remove the airfoils from the platforms by mechanically cutting off the airfoils from the platforms and regenerating airfoil shaped openings in the platforms by such material removal methods as electrodischarge machining. Another method of separation involving heating and then pulling to separate members at a brazed joint is described in U.S. Pat. No. 5,444,911— Goodwater, et al., patented Aug. 29, 1995, the disclosure of which hereby is incorporated herein by reference.

According to the present invention, whatever is the method of separation of members of a segment, a plurality of the above described type of locating features originally included in the platforms for initial manufacture are preserved substantially in their original form. As was mentioned above, known repair methods have included filling, changing, obscuring or covering, rather than preserving in substantially original form, such locating features, particularly recesses such as seal slots, which then later, after repair, must be regenerated such as by machining. Such preserved locating features, according to the present invention, are used in the repair method of the present invention to reposition members into the designed relationship during reassembly. Preservation of such locating features for such use reduces or elininates costly procedures needed for regenerating such features which are essential to the function of the assembly. In addition, use of the original, preserved locating features to accurately position and hold segment members in the form of a segment preform prior to finishing requires only a very small amount of initial securing by welding, such as minimal tack welding which does not affect or distort members of the segment. At the same time, such use minimizes the amount of repair material, such as braze alloy, needed to be added to the segment preform to regenerate required dimensions of the finished segment.

Certain known repair practices employ extensive welding, typically gas tungsten arc welding, to secure members of a segment and to add material to regenerate required dimensions. Although such welding and alloys used for welding can develop mechanical properties greater than do brazing type alloys, such extensive welding has resulted in distortion and damage to a segment being repaired. Frequently, brazing alloys then are applied to correct such defects, frequently filling recesses such as seal slots, and requiring additional machining of the brazed portion to restore segment dimensions. As can be appreciated from all of such operations to correct defects resulting from welding distortion, such known repair processes can be costly to conduct. In addition, while alloys such as brazing alloys or mixtures have sufficient mechanical properties to cover many such defects, none achieve the level of mechanical properties of the original material of the member. Over time, repeated and extensive application of these relatively weaker materials, as has been certain prior practice in the art, results in reducing subsequent repairability of the segment. Practice of the present invention, including preserving and using locating features to relocate accurately members of a segment, greatly reduces requirements for repair welding as well as the amount of braze repair material added to the segment. In this way, use of the invention significantly increases the total life of the segment.

During evaluation of the present invention, a nozzle segment of a gas turbine high pressure turbine nozzle, as shown in FIG. 1 and having members made of the commercially known and available X-40 cobalt base alloy, was observed to include damaged airfoils which needed to be replaced. Members of the nozzle segment were separated to provide the outer platform 12, the inner platform 14, and the two airfoils 16. Such separation was accomplished by mechanically cutting off the two airfoils adjacent the platforms and discarding the damaged airfoils. Selected for reassembly with two replacement airfoils were the separated outer and inner platforms. Material from the original airfoils 16 in the airfoil shaped slots 18 of the inner and outer platforms was removed and slightly larger airfoil shaped slots to facilitate reassembly were regenerated by commercial electrodischarge machining using appropriately shaped electrodes. The selected platforms were positioned in spaced apart relationship, for example in the apparatus of the present invention, which held the platforms at preserved locating features in the designed relationship. Then the members were secured in that position.

Figure 2:
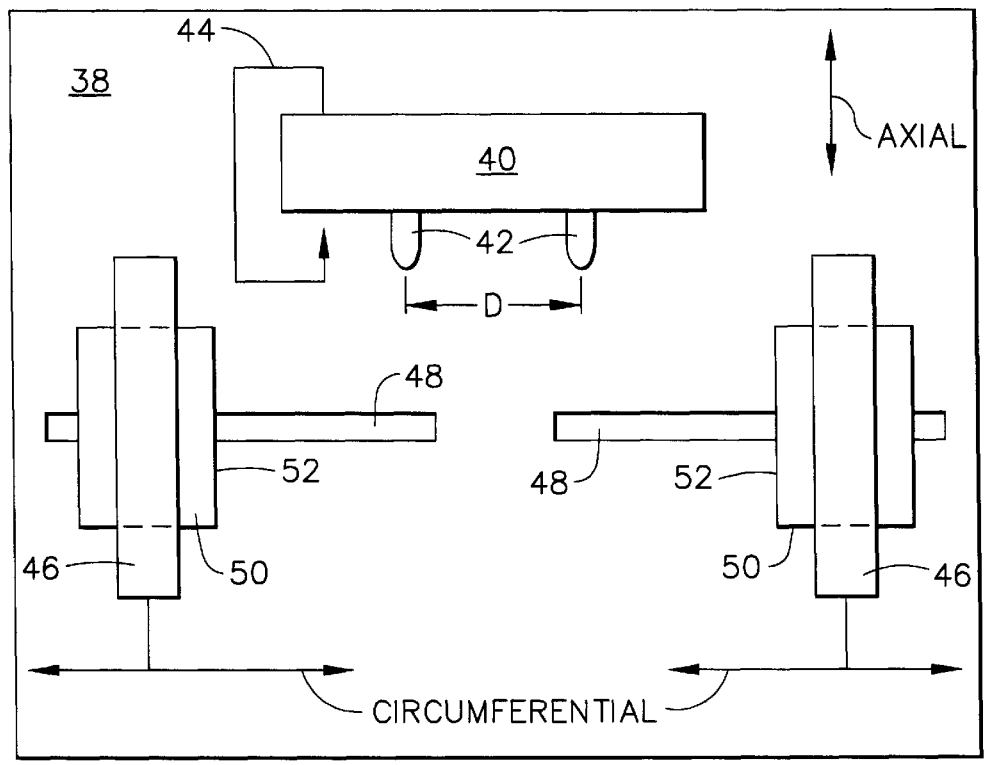
FIG. 2 is a diagrammatic plan view of the apparatus of the present invention for holding the vane segment in the designed relationship.
Figure 3:
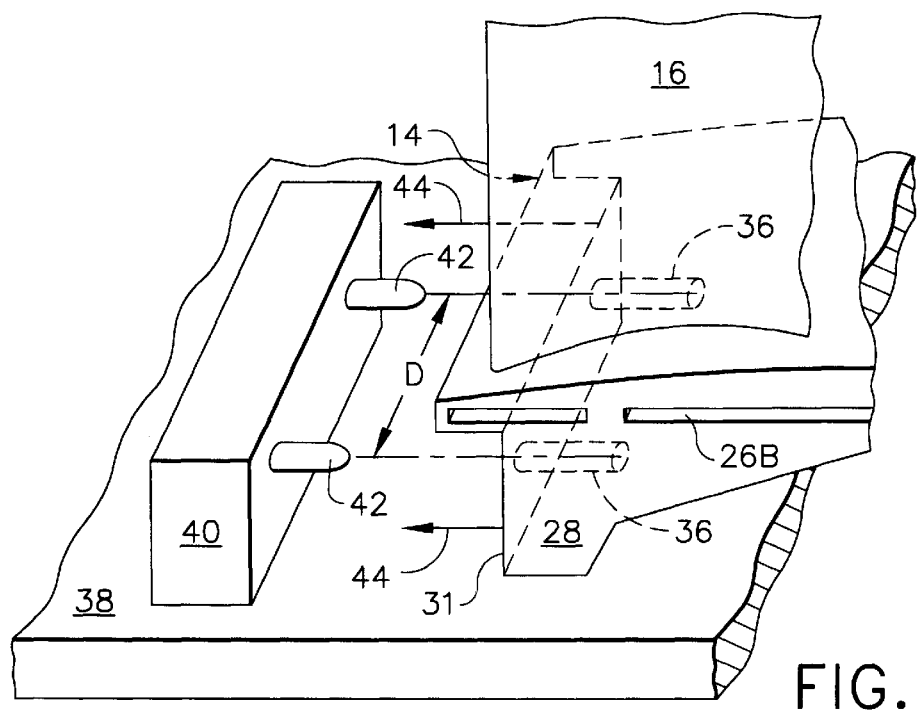
FIG. 3 is a perspective partially fragmentary view of the pedestal of the apparatus of FIG. 2 in position to receive an aft flange of the segment.
Figure 4:
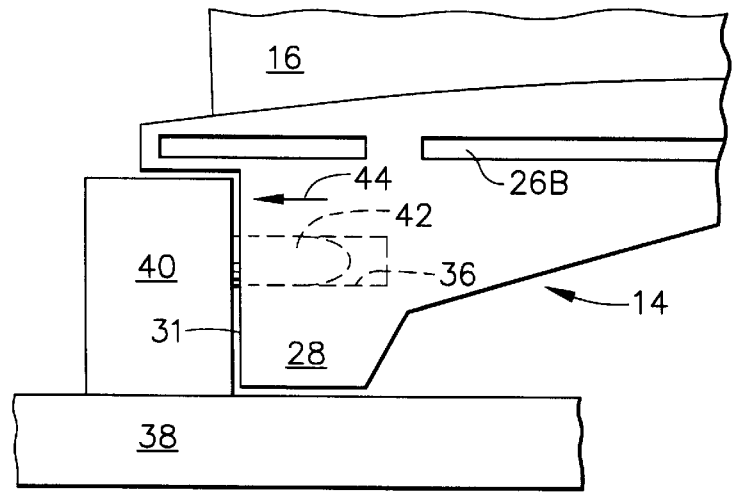
FIG. 4 is a fragmentary view of the pedestal and aft flange of FIG. 3 in registry, to enable holding such elements together.
Figure 5:
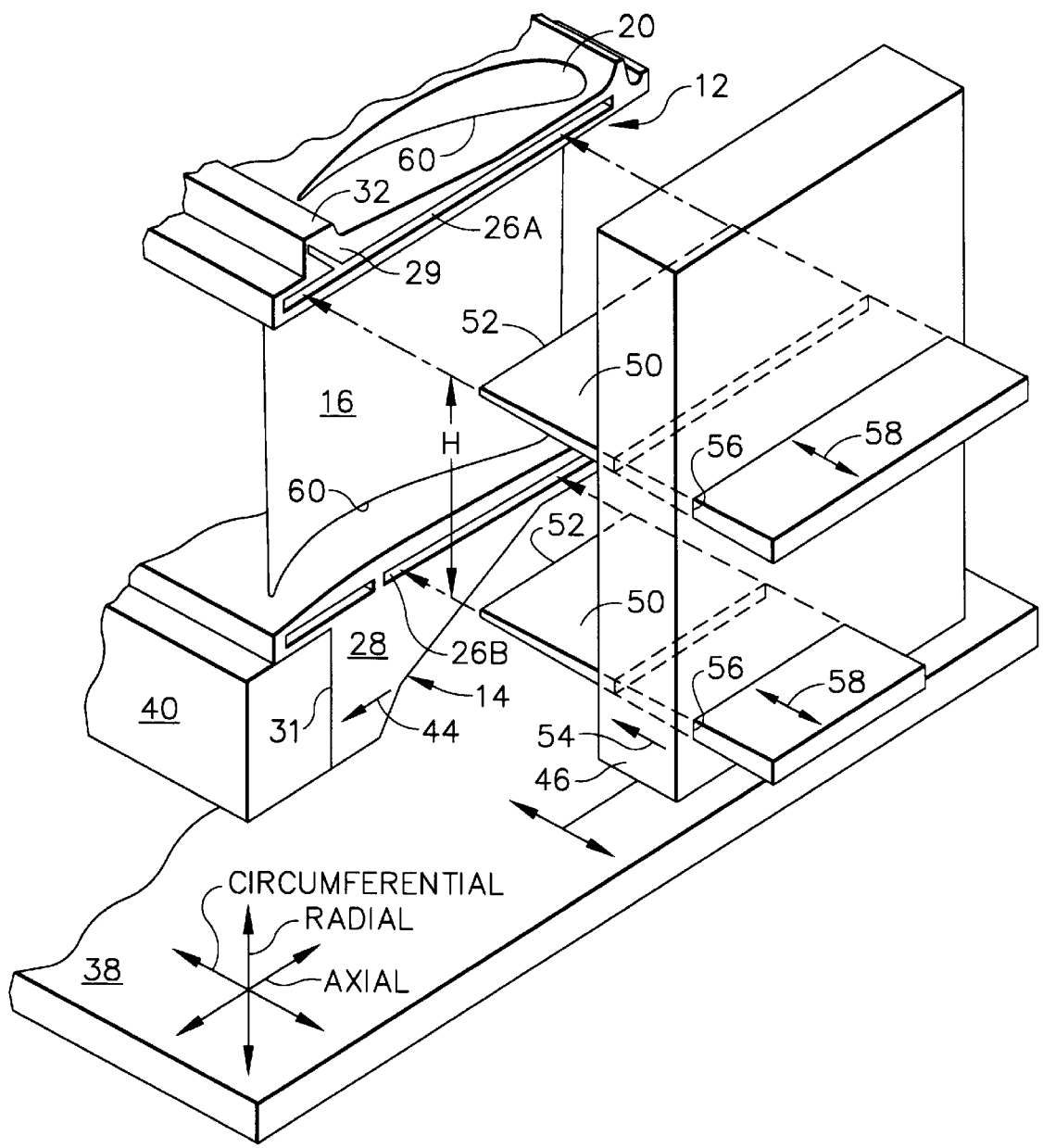
FIG. 5 is a diagrammatic, perspective fragmentary view of a plurality of particularly spaced apart slides having noses in the form of knife edges carried by a slide guide member of the apparatus of FIG. 2 movable toward spaced apart recesses in the form of seal slots of the platforms on one side of the vane segment.

In this example, the members were positioned and held using the apparatus of the present invention shown in FIGS. 2, 3, 4, 5 and 6 of the drawings. FIG. 2 is a diagrammatic plan view of such apparatus including a base 38 to which is fixed a pedestal 40 projecting from the base. Projecting axially, using engine related directions shown by arrows in the drawings, from pedestal 40 are a plurality of distinct protrusions, for example pins 42, aligned and spaced apart generally circumferentially substantially the same as cooperating locating features in a platform member, for example indentations in the form of bolt holes 36 in inner platform 14. Such spacing is represented by distance D in the partially fragmentary perspective view of FIG. 3. Associated with pedestal 40 is axial clamping means represented by force arrows 44 in the drawings, for example in the form of one or more "L" shaped members which is releasably attached to pedestal 40, such as by screws, and is shaped to press platform 14 toward pedestal 40. The apparatus also includes a plurality of slide guides 46, shown in more detail in the perspective view of FIG. 5 and the fragmentary sectional view of FIG. 6. The slide guides are spaced apart generally in the circumferential direction and are carried by the base. The slide guides can be fixed to base 38 or can be movable thereon generally in the circumferential direction, for example in slide grooves 48. Each slide guide carries a plurality of generally radially disposed slides 50, shown in more detail in FIGS. 5 and 6, for example in the form of knife-like edges or noses 52. Although the noses are shown as substantially continuous surfaces or edges, it should be understood that such noses are intended to include a series or array of pins or other protrusions which together perform the function of a nose or edge. Slide noses 52 are spaced apart at a generally radial distance, such as distance H in FIG. 5, which matches a radial distance between cooperating preserved locating features in the inner and outer band or platform members, for example the axially extending recesses in the form of seal slots 26A and 26B in the platforms, as shown in FIG. 5. Each slide nose is shaped to cooperate and register in alignment with such recess. In this example, the slides were held in the slide guides by friction, although a common type of clamping means can be used.

During practice of the method using the apparatus of the present invention in one form shown in the drawings, a segment preform is provided by relatively loosely assembling a pair of replacement airfoils 20 in their respective airfoil shaped openings 18 and 22 in the separated and selected outer and inner platforms 12 and 14, respectively. The replacement airfoils were relatively loosely cold fitted into the slightly larger airfoil shaped openings. This preform then was positioned, as shown in FIG. 3, so that the bolt holes 36 of inner platform 14 were aligned with pins 42 projecting from pedestal 40. The platform was then moved toward pedestal 40 until pins 42 were in registry with, for example abutting or disposed within, bolt holes 36 as shown in FIG. 4. Axial clamping means 44 was engaged to hold pins 42 within bolt holes 36, thereby holding the preform in the axial direction.

Figure 6:
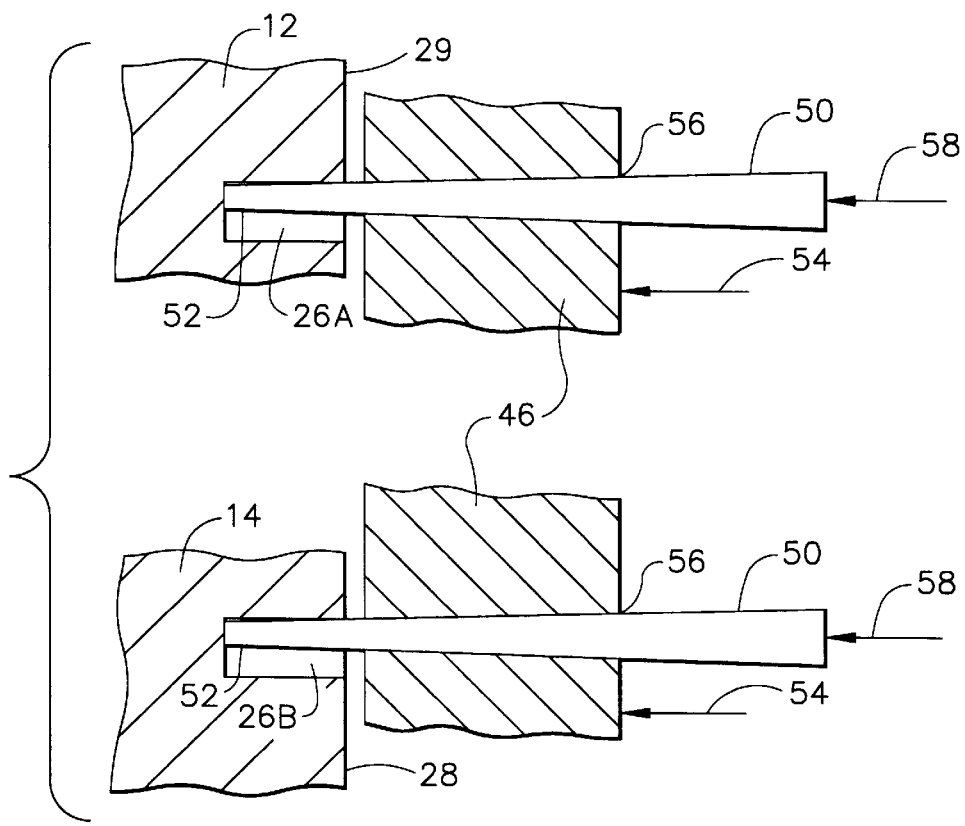
FIG. 6 is a fragmentary sectional view of the slides of FIG. 5 in position within the seal slots.

With the inner platform secured in this position, a pair of slides 50 were moved circumferentially toward the preform through channels 56 in slide guides 46. Each slide 50 included a nose in the form of a knife-like edge 52, spaced apart radially at a distance H generally matching a designed relationship radial distance between preserved seal slots 26A and 26B on one side of the platform, and preserved seal slots 26C and 26D on the other side of the platform. In this example of the embodiment shown in FIGS. 5 and 6, slide guides 46 were fixed to base 38 and slides 50 were movable through channels 56, as shown by arrows 58 to provide flexibility to the operation of the slide guides. The slides were moved circumferentially toward cooperating, opposed seal slots until the slide noses were in registry with respective seal slots, thereby positioning the inner and outer platforms, with the airfoils therebetween, in the designed relationship. The fragmentary sectional view of FIG. 6 shows noses 52 of slides 50 held by friction 54 in registry with their respective cooperating preserved seal slots 26A and 26B. In this example, in order to more accurately position the replacement airfoils 16 within their respective airfoil shaped openings in which they were releasably held, alloy shims were placed in junctures 60, identified in FIG. 5.

With the members of the segment preform restrained in the apparatus in the designed relationship, separate, discrete gas tungsten arc tack welds were spaced about the juncture 60 between the replacement airfoils and the inner and outer platforms to secure the position of the members in the designed relationship. Typically, only about 3 or 4 tack welds about each juncture were applied for such purpose. No distortion of any of the members resulted from such tack welding. Then a brazing alloy powder mixture, of the type described in U.S Pat. No. 4,830,934—Ferrigno, et al. (patented May 16, 1989), was applied to such juncture of the segment preform which was then heated to the alloy brazing temperature. The disclosure of that patent hereby is incorporated herein by reference. Dimensional inspection of the nozzle segment assembly generated in this example showed that the matefaces, lips, flanges, seal slots and flange holes were within acceptable dimensional values and did not have to be refinished. Only one flange machined surface required some build up. Practice of the present invention has been shown to be a more simple, economical and efficient method for the repair of turbine engine vane segments.

The present invention has been described in various forms in connection with specific examples, embodiments and combinations. However, it will be understood by those skilled in the arts involved that this invention is capable of a variety of modifications, variations and amplifications without departing from its scope as defined by the appended claims.

We claim:

1. Apparatus for use in assembling members of a turbine engine vane segment comprising at least one airfoil member carried between spaced apart first and second band members, all of the members when assembled being positioned axially, radially and circumferentially with respect to a turbine engine and relative to each other in a designed relationship, each band member including a plurality of locating features integral with the band member and designed for use in positioning and aligning a plurality of vane segments with respect to each other in the assembly of a turbine engine vane assembly, the apparatus comprising:

a base;

a band holder pedestal fixable to and projecting from the base, the pedestal including a plurality of distinct protrusions projecting generally axially from the pedestal and spaced apart and positioned generally circumferentially at a distance from each other substantially the same as locating features in the form of spaced apart indentations in at least one of the band members;

axial clamping means to hold the band member axially in registry, with the protrusions within cooperating indentations;

a plurality of slide guide members spaced apart and carried on the base circumferentially, each slide guide member carrying a plurality of generally radially disposed slides, each slide including a slide nose spaced apart at a substantially radial distance matching a designed relationship radial distance between locating features in the first and second band members in the form of a generally axially extending recess in each band member, each slide nose shaped to cooperate and be aligned with a recess in a band member; and, circumferential clamping means to hold each slide nose in a cooperating recess circumferentially.

2. The apparatus of claim 1 in which:

the protrusions from the pedestal are spaced apart pins shaped to penetrate band indentations in the form of holes; and, the slide guide noses are knife-like edges shaped to register with recesses in the bands in the form of slots.

3. The apparatus of claim 1 in which the slides are movable generally circumferentially through the slide guide.

4. A method for assembling members of a turbine engine vane segment comprising at least one airfoil member carried between spaced apart first and second band members, all of the members when assembled being positioned axially, radially and circumferentially with respect to a turbine engine and relative to each other in a designed relationship, each band member including a plurality of locating features integral with the band member and designed for use in positioning and aligning a plurality of vane segments with respect to each other in the assembly of a turbine engine vane assembly, the steps of:

providing a vane segment preform including at least one airfoil member releasably disposed between the band members in airfoil shaped slots, at least one band member including locating features in the form of circumferentially spaced apart indentations, each band member including a generally axially extending recess;

holding in registry with the indentations circumferentially disposed generally axially extending secured protrusions spaced apart to match the indentations; and, holding in registry with each recess generally in the circumferential direction a guide nose for each recess to hold the band members at the recesses in the designed relationship.

* * * * *